United States Patent
Hachmann

(10) Patent No.: US 7,464,929 B2
(45) Date of Patent: Dec. 16, 2008

(54) APPARATUS FOR CARRYING OR GUIDING A PRINTING MATERIAL SHEET

(75) Inventor: Peter Hachmann, Dossenheim (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 395 days.

(21) Appl. No.: 11/352,807

(22) Filed: Feb. 13, 2006

(65) Prior Publication Data

US 2006/0180040 A1 Aug. 17, 2006

(30) Foreign Application Priority Data

Feb. 11, 2005 (DE) .................. 10 2005 006 266

(51) Int. Cl.
*B65H 29/24* (2006.01)

(52) U.S. Cl. .............. 271/194; 271/264; 271/195; 271/211; 101/230; 101/231; 101/232; 101/409; 101/410; 101/411; 101/412; 101/420

(58) Field of Classification Search .......... 271/264, 271/194, 195, 211; 101/230, 231, 232, 409, 101/410, 411, 412, 420
See application file for complete search history.

(56) References Cited

U.S. PATENT DOCUMENTS

| 2,848,820 | A |   | 8/1958  | Wallin              |
|-----------|---|---|---------|---------------------|
| 3,272,415 | A | * | 9/1966  | Wallin ...... 242/615.11 |
| 4,804,125 | A |   | 2/1989  | Vits                |
| 5,222,726 | A |   | 6/1993  | Vits                |
| 5,687,964 | A |   | 11/1997 | Stephan et al.      |
| 6,527,268 | B2 | * | 3/2003  | Spurk ............ 271/195 |

FOREIGN PATENT DOCUMENTS

| DE | 14 74 214 A    | 3/1969  |
| DE | 36 07 370 C1   | 11/1987 |
| DE | 38 41 909 A1   | 10/1989 |
| DE | 44 27 448 A1   | 2/1996  |
| DE | 101 12 759 A1  | 10/2001 |

* cited by examiner

*Primary Examiner*—John Q. Nguyen
*Assistant Examiner*—Ernesto Suarez
(74) *Attorney, Agent, or Firm*—Laurence A. Greenberg; Werner H. Stemer; Ralph E. Locher

(57) ABSTRACT

An apparatus for carrying or guiding a printing material sheet on an air cushion between a nozzle surface and the printing material sheet. The apparatus has first nozzle pairs which are arranged in a first row and second nozzle pairs which are arranged in a second row for generating the air cushion. The first nozzle pairs and the second nozzle pairs in each case have a blower nozzle and a suction nozzle, which are paired in such a way that one and the same air flow is blown out by the respective blower nozzle and is aspirated, at least predominantly, by the suction nozzle that is paired with the blower nozzle. The suction nozzles of the first nozzle pairs are arranged in such a way between the blower nozzles of the second nozzle pairs and the suction nozzles of the second nozzle pairs such that the air flows of the second nozzle pairs flow past the suction nozzles of the first nozzle pairs.

8 Claims, 5 Drawing Sheets

APPARATUS FOR CARRYING OR GUIDING A PRINTING MATERIAL SHEET

BACKGROUND OF THE INVENTION

Field of the Invention

The invention lies in the printing technology field. More specifically, the present invention relates to an apparatus for carrying or guiding a printing material sheet on an air cushion between a nozzle surface and the printing material sheet. The apparatus has first nozzle pairs which are arranged in a first row and second nozzle pairs which are arranged in a second row for generating the air cushion. The first nozzle pairs and the second nozzle pairs in each case comprises a blower nozzle and a suction nozzle, which are paired in such a way that one and the same air flow is blown out by the respective blower nozzle and is sucked in, at least predominantly, by the suction nozzle which is paired with that blower nozzle.

An apparatus of that type is described in German published, non-prosecuted patent application DE 1 474 214 (cf., in particular, FIG. 3) and in the related U.S. Pat. Nos. 3,231,165 and 3,272,415. There, the suction nozzles of the first nozzle pairs are arranged in such a way between the blower nozzles of the second nozzle pairs that the air streams of the first nozzle pairs do not flow past the blast air nozzles of the second nozzle pairs. There is the risk on account of that configuration that the printing material sheet is attracted by suction by the suction nozzles of the first nozzle pairs to such an extent that the printing material sheet comes into contact with the nozzle surface. The result of this contact would be smearing of printing ink which is printed onto the rear side of the sheet, if the apparatus were used in a perfecter printing press. For this reason, the apparatus is unsuitable for an application of this type.

SUMMARY OF THE INVENTION

It is accordingly an object of the invention to provide an apparatus for carrying or guiding printing material sheets which overcomes the above-mentioned disadvantages of the heretofore-known devices and methods of this general type and which is suitable for use in a perfecter printing press.

With the foregoing and other objects in view there is provided, in accordance with the invention, an apparatus for carrying or guiding a printing material sheet on an air cushion between a nozzle surface and the printing material sheet. The apparatus comprises:
- a plurality of first nozzle pairs formed in the nozzle surface along a first row, each of the first nozzle pairs having a blower nozzle and a suction nozzle;
- a plurality of second nozzle pairs formed in the nozzle surface along a second row, each of the second nozzle pairs having a blower nozzle and a suction nozzle;
- the first and second nozzle pairs being disposed for generating the air cushion between the nozzle surface and the printing material sheet;
- the blower nozzle and the suction nozzle of each of the nozzle pairs being paired such that an air flow emitted by the blower nozzle is aspirated, at least predominantly, by the respective the suction nozzle;
- the suction nozzles of the first nozzle pairs being disposed between the blower nozzles of the second nozzle pairs and the suction nozzles of the second nozzle pairs such that the air flows of the second nozzle pairs flow past the suction nozzles of the first nozzle pairs.

In other words, the apparatus according to the invention for carrying or guiding a printing material sheet on an air cushion between a nozzle surface and the printing material sheet, has first nozzle pairs which are arranged in a first row and second nozzle pairs which are arranged in a second row for generating the air cushion. The first nozzle pairs and the second nozzle pairs in each case comprising a blower nozzle, i.e., a blast air nozzle, and a suction nozzle. The two are paired in such a way that one and the same air flow is blown out by the respective blower nozzle and is aspirated, or sucked in, at least predominantly, by the suction nozzle which is paired with that respective blower nozzle. The suction nozzles of the first nozzle pairs are arranged in such a way between the blower nozzles of the second nozzle pairs and the suction nozzles of the second nozzle pairs such that the air flows of the second nozzle pairs flow past the suction nozzles of the first nozzle pairs.

Accordingly, blower nozzles of the second nozzle pairs lie closer to every blower nozzle of the first nozzle pairs than the suction nozzle which is paired with the respective blower nozzle of the first nozzle pairs. The blower air streams of said blower nozzles of the second nozzle pairs support the printing material sheet in the direct surroundings of the suction nozzles of the first nozzle pairs, in such a way that the suction air flows of said suction nozzles are not capable of sucking the printing material sheet into contact with the nozzle surface. For this reason, the apparatus according to the invention is particularly suitable for perfector printing presses.

Either the entire air amount or the entire volumetric flow of the air flow which is ejected by the respective blower nozzle or a predominant proportion of said air amount or volumetric flow is sucked in by the suction nozzle which is paired with said blower nozzle.

In one development, the air flows of the first nozzle pairs are parallel to and identically oriented with respect to the air flows of the second nozzle pairs.

In a further development, the air flows of the first nozzle pairs and the air flows of the second nozzle pairs are oriented transversely with respect to a transport direction of the printing material sheet and toward a side edge of the printing material sheet.

In a further development, the first nozzle pairs and the second nozzle pairs are arranged offset with respect to one another substantially in the manner of a chessboard pattern.

In a further development, the blower nozzle and the suction nozzle of the respective first nozzle pair and of the respective second nozzle pair are connected to one and the same blower in order to form an air circuit.

In a further development, in the first nozzle pairs and the second nozzle pairs, the suction nozzles in each case have a greater nozzle orifice cross-sectional area than the blower nozzles.

In a further development, the nozzle orifice cross-sectional area of the respective suction nozzle is approximately twice as great as the nozzle orifice cross-sectional area of the cooperating blower nozzle.

In a further development, there are third nozzle pairs in a third row and fourth nozzle pairs in a fourth row for generating the air cushion, the third nozzle pairs and the fourth nozzle pairs being configured and arranged mirror-symmetrically with regard to the first nozzle pairs and the second nozzle pairs.

In a further development, air flows of the third nozzle pairs and air flows of the fourth nozzle pairs are oriented in antiparallel with regard to the air flows of the first nozzle pairs and the air flows of the second nozzle pairs.

The apparatus according to the invention or its respective development can be a constituent part of a sheet transport drum or of a sheet guiding apparatus which is arranged next to the sheet transport drum. In the first case, the nozzle surface with the nozzle pairs is arranged on the sheet transport drum as the circumferential surface of the latter for carrying the printing material sheets pneumatically. In the other case, the nozzle surface is configured on the sheet guiding apparatus and the printing material sheets which are transported by means of the sheet transport drum are guided by the nozzle surface along said sheet transport drum.

Other features which are considered as characteristic for the invention are set forth in the appended claims.

Although the invention is illustrated and described herein as embodied in apparatus for carrying or guiding a printing material sheet, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIGS. 6A to 8B are side and plan views of three different variants for configuring the blower nozzles from FIG. 3.

DESCRIPTION OF THE PREFERRED EMBODIMENTS

Figure 1:
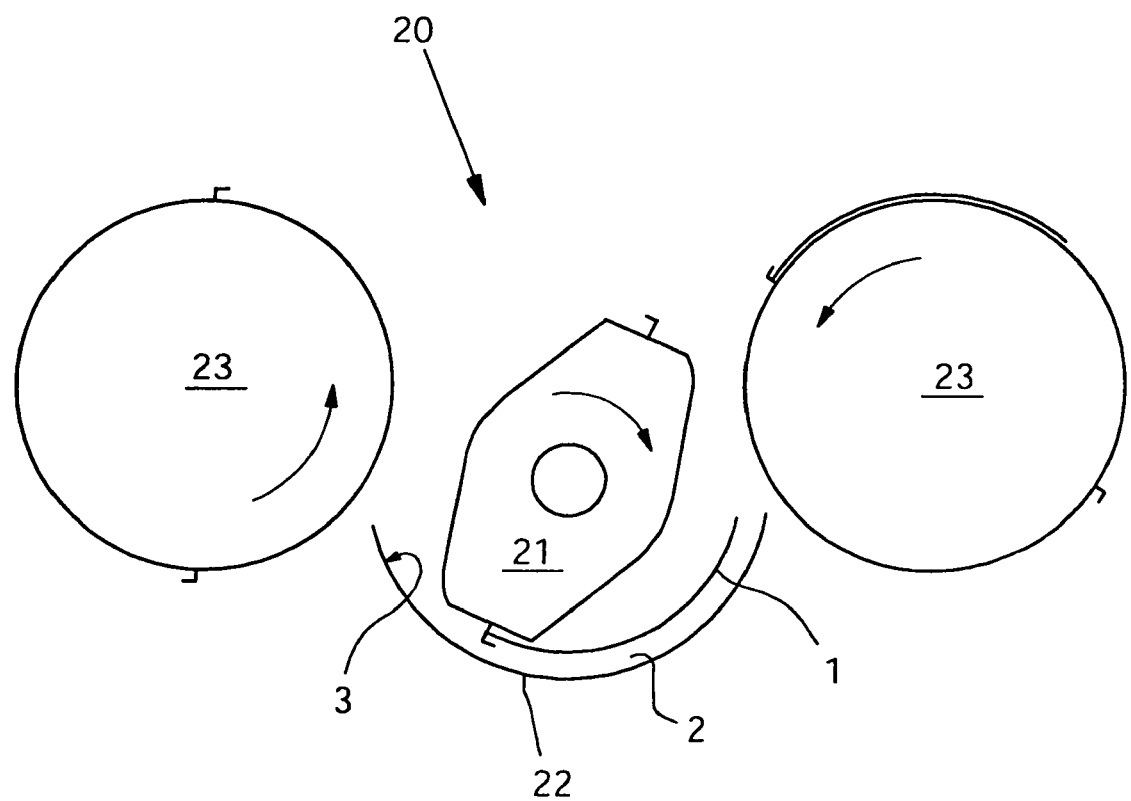
FIG. 1 is a diagrammatic partial side view of a printing press with a sheet guiding apparatus.

Referring now to the figures of the drawing in detail and first, particularly, to FIG. 1 thereof, there is shown an excerpt from a printing press 20 having impression cylinders 23 and a sheet transport drum 21. The sheet transport drum 21 is arranged between the impression cylinders 23, in order to transfer printing material sheets 1 from one impression cylinder 23 to the other. A sheet guiding apparatus 22 for pneumatically guiding the printing material sheets 1 which are transported by the sheet transport drum 21 is disposed below the sheet transport drum 21. The sheet guiding apparatus 22 has a nozzle surface 3 for forming an air cushion 2 between the nozzle surface 3 and the respective printing material sheet 1. The air cushion 2 prevents all contact between the nozzle surface 3 and the printing material sheet 1 which is printed on both sides. The nozzle surface 3 extends in a manner which is curved around the rotational axis of the sheet transport drum 21. The nozzle surface 3 is thus bowl-shaped.

Figure 2:
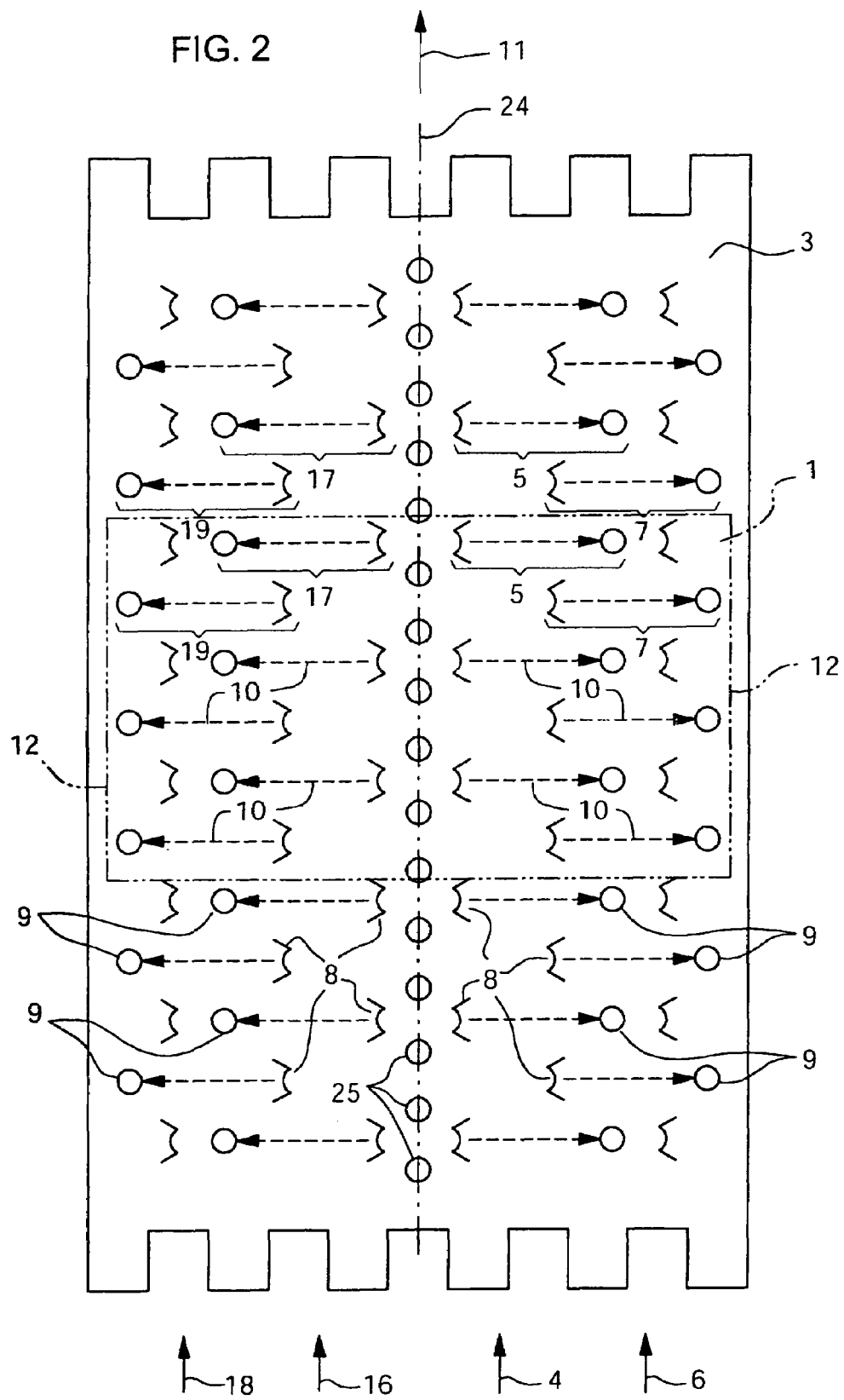
FIG. 2 is a plan view of a nozzle surface of the sheet guiding apparatus from FIG. 1.

FIG. 2 shows a developed view of the nozzle surface 3. The nozzle surface 3 comprises first nozzle pairs 5 disposed along a first row 4, second nozzle pairs 7 disposed along a second row 6, third nozzle pairs 17 disposed along a third row 16, and fourth nozzle pairs 19 disposed along a fourth row 18. The rows 4, 6, 16, 18 extend parallel to a transport direction 11 of the printing material sheets 1 which is defined by the sheet transport drum 21. Each nozzle pair 5, 7, 17, 19 comprises a blast nozzle or blower nozzle 8 and a suction nozzle 9 which are assigned cooperatively to one another in such a way that an air flow 10 is blown out by the blast nozzle 8 and aspirated in by the suction nozzle 9. As the first row 4 and the second row 6 are configured mirror-symmetrically to the third row 16 and the fourth row 18 with respect to a center axis 24 of the nozzle surface 3, the air flows 10 of the first and second rows 4, 6 are oriented toward one side edge 12 of the guided printing material sheet 1, and the air flows 10 of the third and fourth rows 16, 18 are oriented toward the other side edge 12. In the drawing, the air flows 10 are oriented transversely with respect to the transport direction 11 at a right angle; however, the air flows 10 can also be oriented transversely with respect to the transport direction 11 at an angle other than 90 degrees. Further blower nozzles 25 are arranged between the blower nozzles 8 of the first row 4 and the blower nozzles 8 of the third row 16, which further blower nozzles 25 form a row along the center axis 24 and are holes which are oriented substantially perpendicularly relative to the nozzle surface 3.

Figure 3:
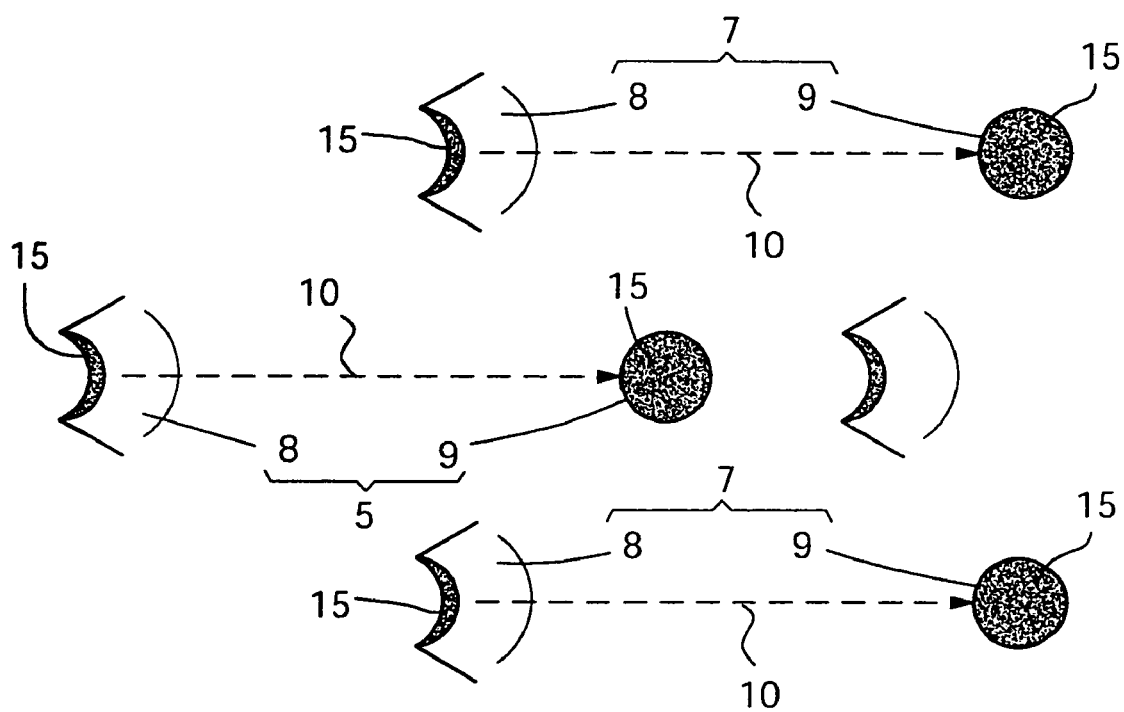
FIG. 3 shows blower and suction nozzles of the nozzle surface from FIG. 2.

FIG. 3 shows a nozzle group, comprising a first nozzle pair 5 and two second nozzle pairs 7. The nozzle pattern which is shown in FIG. 2 and is substantially in the manner of a chessboard pattern is composed of a multiplicity of nozzle groups of this type. The air flow 10 which is ejected out of the blower nozzle 8 of the first nozzle pair 5 firstly has to flow through between the blower nozzles 8 of the second nozzle pair 7, before the air flow 10 can flow into the suction nozzle 9 of the first nozzle pair 5. The air flows 10 which are ejected out of the blower nozzles 8 of the second nozzle pair 7 firstly have to flow closely past the suction nozzle 9 of the first nozzle pair 5, before those air flows 10 can flow into the suction nozzles 9 of the second nozzle pair 7. Here, the air flows 10 which are ejected out of the blower nozzles 8 of the second nozzle pairs 7 flow through in each case between two of the suction nozzles 9 of the first nozzle pair 5 to the suction nozzles 9 of the second nozzle pairs 7 (cf. FIG. 2). As a result of the fact that the air flows 10 which are ejected out of the blower nozzles 8 of the second nozzle pairs 7 pass the suction nozzle 9 of the first nozzle pair 5 so closely, the air flows 10 of the second nozzle pairs 7 prevent the printing material sheet 1 from being attracted locally to an excessive extent by the suction nozzle 9 of the first nozzle pair 5 and, as a result, making contact with the nozzle surface 3 in the region of said suction nozzle 9. The air flows 10 compensate to a certain extent for the vacuum, i.e., the sucking action of the suction nozzle 9 of the first nozzle pair 5 in its immediate surrounding area. Furthermore, FIG. 3 shows that the nozzle orifice cross-sectional area 15 of every suction nozzle 9 is greater than the nozzle orifice cross-sectional area 15 of the respectively associated blower nozzle 8. This is true for every one of the nozzle pairs 5, 7, 17, 19. The nozzle orifice cross-sectional area 15 of the respective suction nozzle 9 is preferably approximately twice as great as the nozzle orifice cross-sectional area 15 of the associated blower nozzle 8.

Figure 4:
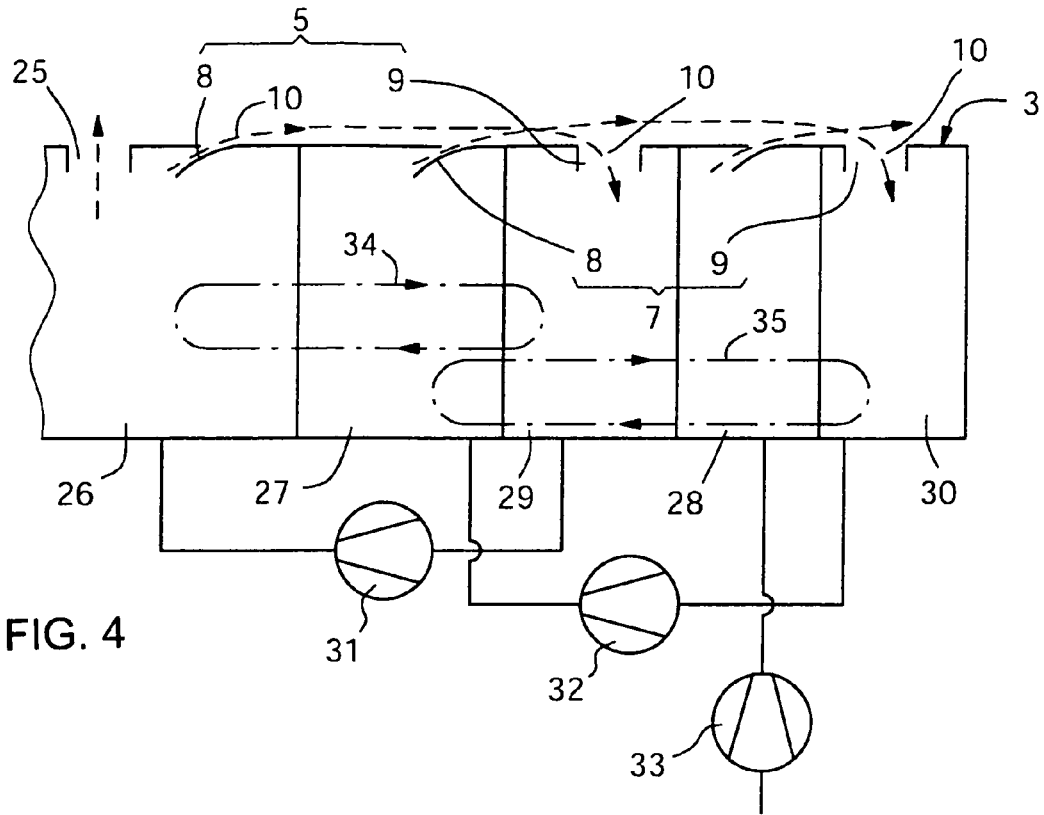
FIG. 4 is a side view diagram of a first variant for supplying the blower and suction nozzles of FIG. 3 with air.

Referring now to FIG. 4, there is shown the configuration of the sheet guiding apparatus 22 as an air box having a first blowing chamber 26, a second blowing chamber 27, a third blowing chamber 28, a first suction chamber 29 and a second suction chamber 30. Blowing and suction chambers of the same type for the third and fourth nozzle pairs 17, 19 are arranged mirror-symmetrically to the blowing and suction chambers 26 to 30 (shown in FIG. 4) of the first and second nozzle pairs 5, 7 with regard to the center axis 24 (cf. FIG. 2). One or more metal sheets which form the nozzle surface 3 cover all the blowing and suction chambers of the air box. Furthermore, FIG. 4 shows that the second blowing chamber 27 is arranged between the first blowing chamber 26 and the first suction chamber 29, and that the third blowing chamber 28 is arranged between the first suction chamber 29 and the second suction chamber 30. The blower nozzles 25 which lie on the center axis 24 and the blower nozzles 8 of the first nozzle pairs 5 open into the first blowing chamber 26. The blower nozzles 8 of the second nozzle pairs 7 open into the second blowing chamber 27. Blower nozzles which are not designated in the drawing open into the third blowing chamber 28. The suction nozzles 9 of the first nozzle pairs 5 open into the first suction chamber 29. The suction nozzles 9 of the second nozzle pairs 7 open into the second suction chamber 30.

Figure 5:
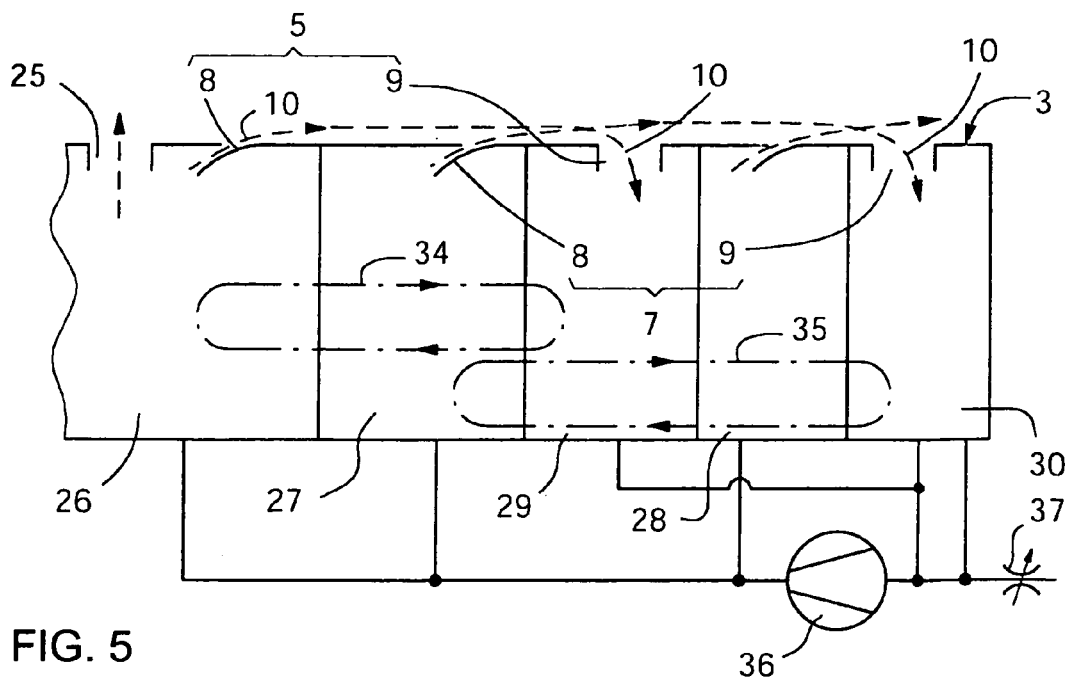
FIG. 5 is a side view diagram of a second variant for supplying the blower and suction nozzles of FIG. 3 with air.

The foregoing description of FIG. 4 is also applicable to the embodiment of FIG. 5 in the equivalent sense. The exemplary embodiments which are shown in FIGS. 4 and 5 differ from one another only with regard to the air supply of the air box in the manner which is described in the following text.

According to FIG. 4, the suction side of a first fan or a first blower 31 is connected to the first suction chamber 29 and the blowing side is connected to the first blowing chamber 26, with the result that, together with the two chambers 26, 29 and the air flows 10 of the first nozzle pairs 5, the first blower 31 forms a first air circuit 34 which is open to the atmosphere and is symbolized in the drawing by a phantom line. The first blower 31 pumps the air out of the first suction chamber 29 into the first blowing chamber 26, with the result that a vacuum prevails in the former and a positive pressure prevails in the latter. The suction side of a second blower 32 is connected to the second suction chamber 30 and the blowing side is connected to the second blowing chamber 27, with the result that a second air circuit 35 is formed. The second blower 32 pumps the air out of the second suction chamber 30 into the second blowing chamber 27 and in the process generates a vacuum which prevails at the suction nozzles 9 of the second suction chamber 30 and a positive pressure which prevails at the blower nozzles 8 of the second blowing chamber 27. A third blower 33 is connected to the third blowing chamber 28.

According to FIG. 5, the suction side of a fan or blower 36 is connected at the same time to the first suction chamber 29 and to the second suction chamber 30 and the blowing side is connected at the same time to the first, second and third blowing chambers 26, 27, 28, with the result that one and the same blower 36 participates both in the formation of the first air circuit 34 and in the formation of the second air circuit 35. The blower 36 pumps the air out of the suction chambers 29, 30 into the blowing chambers 26, 27, 28, with the result that the vacuum is generated in the former and the positive pressure is generated in the latter. A throttling valve 37 which is connected to the suction side of the blower 36 can be set in order to regulate the air supply of the air box, for example according to a characteristic curve which is stored in a non-illustrated electronic control device. Here, the throttling valve 37 can form the actuator of a closed control loop.

Figure 6:
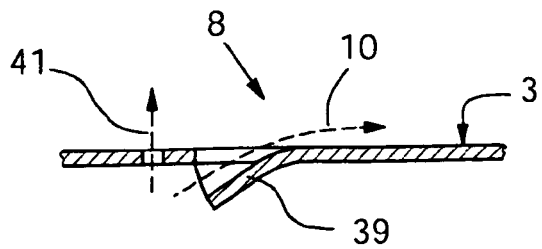
Figure 6:
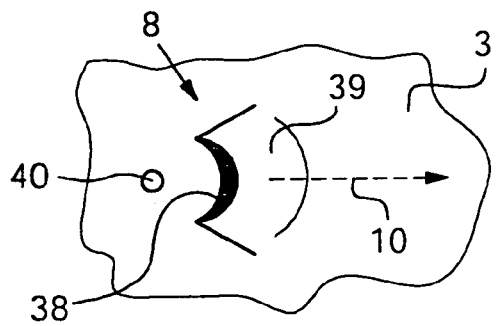

FIGS. 6A and 6B show a possible embodiment of the blower nozzles 8 as so-called venturi nozzles having a nozzle orifice 38 with a crescent-shaped slot. Starting from the lower edge of the nozzle orifice 38, a tab or bead 39 rises as far as the nozzle surface 3, as is made clear by the lateral sectional illustration in FIG. 6A, and the bead 39 broadens, as is made clear by the plan view of the nozzle surface 3 in FIG. 6B. A free jet nozzle 40 is made in the nozzle surface 3 as a hole on that side of the nozzle orifice 38 which faces away from the tab 39. The free jet nozzle 40 is arranged close to the blower nozzle 8 and is not shown in FIGS. 2 to 5 for reasons of better clarity. The free jet nozzle 40 generates a blast air jet 41 which is substantially perpendicular relative to the nozzle surface 3 and fills a vacuum which is generated by the blower nozzle 8 when it ejects the air flow 10 at its rear with air. Here, the free jet nozzle 40 assists the blower nozzle 8 in the form of a so-called purging nozzle.

Figure 7:
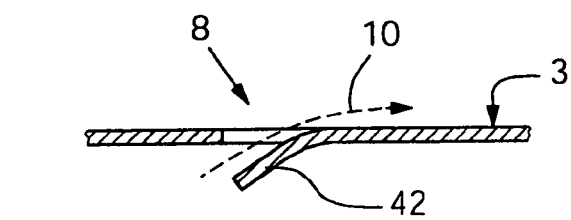
Figure 7:
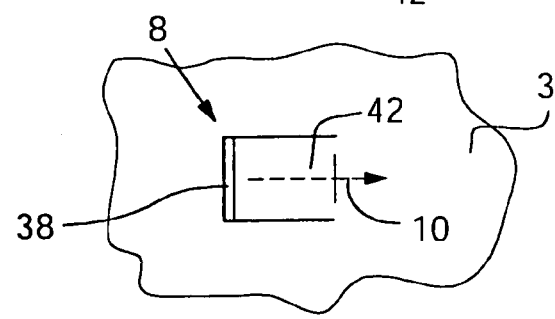

FIGS. 7A (lateral sectional illustration) and 7B (plan view) show another possible embodiment of the blower nozzles 8, the latter having a tab 42 which is bent into the respective blowing chamber 26 or 27 and the object of which, just like the object of the bead 39 in FIGS. 6A and 6B, is to define the direction of the air flow 10 and to ensure that the air flow 10 bears against the nozzle surface 3 and flows parallel to the latter.

Figure 8:
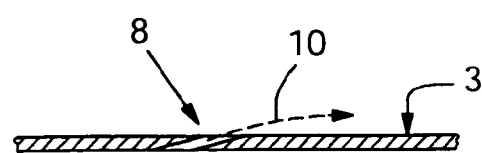
Figure 8:
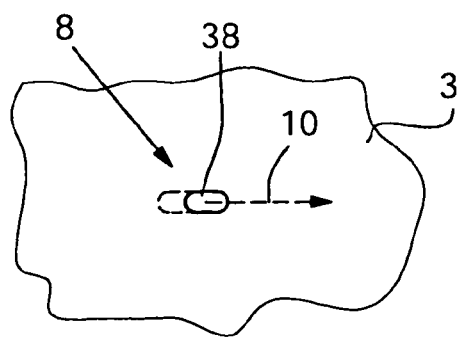

According to FIGS. 8A (lateral sectional illustration) and 8B (plan view), the blower nozzles 8 are configured as oblique holes in another embodiment.

This application claims the priority, under 35 U.S.C. § 119, of German patent application 10 2005 006 266.0, filed Feb. 11, 2005, which is herewith incorporated by reference in its entirety.

I claim:

1. An apparatus for carrying or guiding a printing material sheet on an air cushion between a nozzle surface and the printing material sheet, comprising:

a plurality of first nozzle pairs formed in the nozzle surface along a first row, each of said first nozzle pairs having a blower nozzle and a suction nozzle;

a plurality of second nozzle pairs formed in the nozzle surface along a second row, each of said second nozzle pairs having a blower nozzle and a suction nozzle;

said first and second nozzle pairs being disposed for generating the air cushion between the nozzle surface and the printing material sheet;

said blower nozzle and said suction nozzle of each of said nozzle pairs being paired such that an air flow emitted by said blower nozzle is aspirated, at least predominantly, by the respective said suction nozzle;

said suction nozzles of said first nozzle pairs being disposed between said blower nozzles of said second nozzle pairs and said suction nozzles of said second nozzle pairs such that the air flows of said second nozzle pairs flow past said suction nozzles of said first nozzle pairs; and third nozzle pairs disposed in a third row and fourth nozzle pairs disposed in a fourth row for generating the air cushion, said third nozzle pairs and said fourth nozzle pairs being configured and arranged mirror-symmetrically with regard to said first nozzle pairs and said second nozzle pairs said third nozzle pairs and said fourth nozzle pairs being configured to form air flows oriented antiparallel with regard to the air flows of said first nozzle pairs and the air flows of said second nozzle pairs.

2. The apparatus according to claim 1, wherein said first nozzle pairs are configured to form air flows extending parallel to and in the same direction as the air flows generated by said second nozzle pairs.

3. The apparatus according to claim 1, wherein said first nozzle pairs and said second nozzle pairs are configured to generate respective air flows oriented transversely with respect to a transport direction of the printing material sheet and towards a side edge of the printing material sheet.

4. The apparatus according to claim 1, wherein said first nozzle pairs and said second nozzle pairs are offset with respect to one another substantially in a chessboard pattern.

5. The apparatus according to claim 1, which comprises a blower device communicating with said blower nozzles and said suction nozzles of said first nozzle pairs and of said second nozzle pairs to form an air circuit.

6. The apparatus according to claim 1, wherein said suction nozzles in each case have a greater nozzle orifice cross-sectional area than said blower nozzles.

7. The apparatus according to claim 6, wherein said suction nozzles have a nozzle orifice cross-sectional area approximately twice a nozzle orifice cross-sectional area of the respectively associated blower nozzles.

8. A printing press, comprising:

a sheet transport drum and a sheet guiding apparatus according to claim 1 disposed in operative relationship with said sheet transport drum.

\* \* \* \* \*